United States Patent [19]

Green

[11] Patent Number: 5,327,615
[45] Date of Patent: Jul. 12, 1994

[54] WINDSHIELD WIPER BLADE ASSEMBLY INCLUDING CONICAL CLEANING TIPS

[76] Inventor: Gerald D. Green, 10236 Avenida de la Cantina, San Diego, Calif. 92129

[21] Appl. No.: 18,163

[22] Filed: Feb. 16, 1993

[51] Int. Cl.$^5$ .............................. B60S 1/28; B60S 1/38
[52] U.S. Cl. .............................. 15/250.40; 15/250.41; 15/250.36; 15/245; 15/188
[58] Field of Search .......... 15/250.41, 250.40, 250.42, 15/250.36, 250.04, 250.09, 186, 187, 188, 245

[56] References Cited

U.S. PATENT DOCUMENTS

| | | | |
|---|---|---|---|
| 1,970,497 | 8/1934 | Gregorio | 15/250.41 |
| 2,080,129 | 5/1937 | Gulotta | 15/250.41 |
| 2,273,817 | 2/1942 | Chellea | 15/250.41 |
| 3,638,274 | 2/1972 | Farver | 15/250.41 |
| 3,675,263 | 7/1972 | Durham | 15/188 |
| 3,939,524 | 2/1976 | Knights | 15/250.04 |
| 4,060,872 | 12/1977 | Bucklitzsch | 15/250.04 |
| 4,192,038 | 3/1980 | Klein et al. | 15/250.06 |
| 4,317,251 | 3/1982 | Priesemuth | 15/250.41 |
| 4,339,839 | 7/1982 | Knights | 15/250.04 |
| 4,567,621 | 2/1986 | Alley, Jr. | 15/250.41 |
| 4,611,364 | 9/1986 | Grübner | 15/250.22 |
| 4,649,593 | 3/1987 | Gilliam et al. | 15/250.41 |
| 4,754,517 | 7/1988 | Aldous | 15/250.04 |
| 5,040,260 | 8/1991 | Michaels | 15/188 |
| 5,060,337 | 10/1991 | Van Niekerk | 15/188 |
| 5,189,752 | 3/1993 | Longacre et al. | 15/250.41 |
| 5,235,720 | 8/1993 | Kinder | 15/250.41 |

FOREIGN PATENT DOCUMENTS

| | | | |
|---|---|---|---|
| 2707703 | 8/1978 | Fed. Rep. of Germany | 15/250.41 |
| 58311 | 6/1953 | France | 15/188 |

Primary Examiner—Timothy F. Simone
Assistant Examiner—Gary K. Graham
Attorney, Agent, or Firm—Brown, Martin, Haller & McClain

[57] ABSTRACT

A wiper blade assembly has an elongate carrier strip for supporting on a windshield wiper arm, a pair of spaced, flexible wiper blades depending parallel to one another from the carrier strip with a gap between the blades, and a cleaning member supported in the gap between the blades, the cleaning member having a base portion and a plurality of conical cleaning tips depending from the base portion. The cleaning tips are shorter than the wiper blades so that they do not contact a windshield surface until the wiper blades are deformed in a wiping action, and are more rigid than the blades.

16 Claims, 2 Drawing Sheets

WINDSHIELD WIPER BLADE ASSEMBLY INCLUDING CONICAL CLEANING TIPS

BACKGROUND OF THE INVENTION

The present invention relates generally to windshield wipers for cleaning and removing moisture from the curved windshields or windows of vehicles or the like, and is particularly concerned with a wiper blade assembly for fitting onto conventional windshield wiper arms.

Conventional windshield wipers have a single flexible blade, which is not always effective in removing all deposits and debris collected on a windshield. Various proposals have been made to provide a wiper arrangement of two wiper blades with a brush arrangement between the blades. For example, U.S. Pat. Nos. 3,939,524 and 4,339,839 of Knights both describe wiper arrangements in which one or more brushes is mounted between a pair of wiper blades so as to remove more dirt and debris from the windshield. The brushes have conventional bristles mounted in a spine. However, such bristles will scratch the window surface over time.

SUMMARY OF THE INVENTION

It is an object of the present invention to provide a new and improved wiper blade assembly for windshield wipers.

According to the present invention, a wiper blade assembly is provided which comprises an elongated carrier member adapted for mounting on a windshield wiper arm, a pair of spaced, flexible wiper blades mounted on the carrier member to project downwardly and parallel to one another for contact with a windshield surface with a gap between the spaced blades, and an elongated cleaning member of elastomeric material located in the gap between the blades, the cleaning member having a base portion and a plurality of conically shaped cleaning tips depending downwardly from the base portion with the ends of the cleaning tips spaced above the lower edge of the wiper blades.

Preferably, the cleaning member at least is formed in one piece. The wiper blades and cleaning member are formed integrally in one piece in the preferred embodiment of the invention, with the cleaning tips being more rigid than the wiper blades. Thus, when the assembly is wiped across a window surface, the wiper blades will deform in a squeegee action while the ends of the cleaning tips contact the screen in a scrubbing action. The cleaning tips are designed to be sufficiently rigid that they will not tend to deform excessively during the wiping action, and at the same time will not scratch the windscreen.

When this wiper assembly is used in conjunction with a suitable detergent, the leading wiper blade will tend to remove moisture and loose debris from the path of the assembly. The cleaning tips will work in conjunction with any detergent to break up any film of oil, grease or the like which has formed on the windscreen, and to loosen debris which has become stuck to the glass. As the film begins to break up, the trailing wiper blade will clear the residue from the windshield. Thus, road film and other debris is continuously broken up and removed by the scrubbing action of the cleaning tips, without damaging the windshield.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
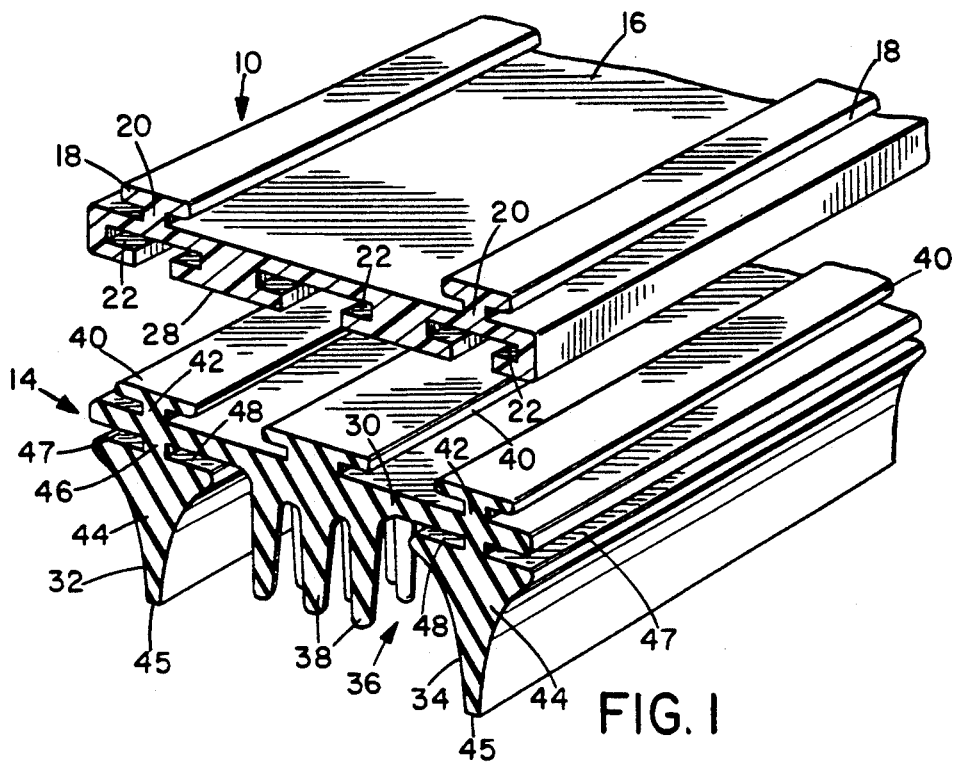
FIG. 1 is a cross-sectioned perspective view of a portion of the wiper blade and mounting strip according to a first embodiment of the invention.
Figure 2:
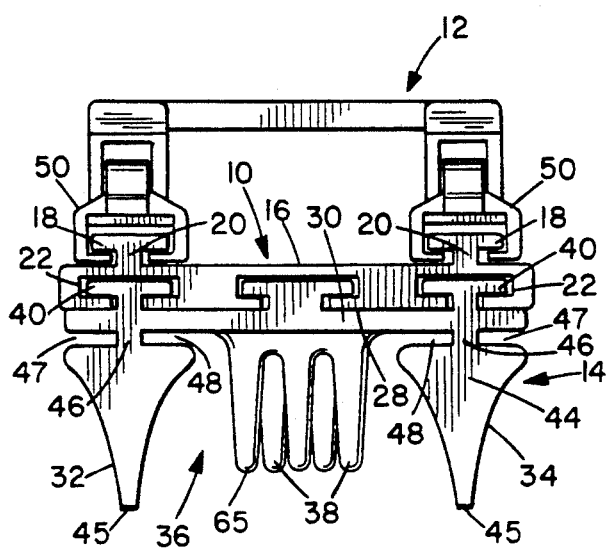
FIG. 2 is an end view of the assembled wiper blade and mounting strip attached to a wiper frame.
Figure 3:
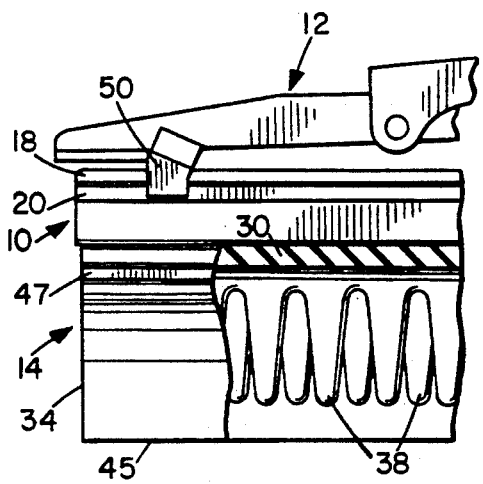
FIG. 3 is a side elevation view of the structure of FIG. 2.

FIG. 1 of the drawings illustrates a wiper blade assembly according to a preferred embodiment of the present invention, comprising a mounting or carrier strip 10 for mounting in a conventional wiper arm frame 12 as illustrated in FIGS. 2 and 3, and a wiper blade member 14 supported by strip 10 as illustrated in FIG. 2.

Carrier strip 10 is preferably formed from hard or rigid plastic material such as ABS and is extruded in one piece. Strip 10 has an upper flat face 16 to which a pair of spaced, flat flanges or tongues 18 are secured via webs 20. Three spaced, elongate C-shaped channels or slots 22 are formed in the lower surface 28 of the strip 10, with the central channel being wider than the two side channels.

Blade member 14 is also preferably formed in one piece from a suitable resilient plastic material such as Nordel ®. Member 14 comprises a flat base portion 30 from which a pair of spaced, parallel wiper blades 32, 34 project with a gap or spacing 36 between the blades. A plurality of conical cleaning tips 38 project from a central region of the base portion 30 between the wiper blades. The tips 38 are shorter than the blades 32, 34, as best illustrated in FIGS. 1 and 2.

Three spaced flat flanges or tongues 40 are secured to the upper surface of base portion 30 via webs 42, and are designed for sliding engagement in the respective C-channels 22 of the carrier strip 10, as illustrated in FIG. 2. Each wiper blade 32, 34 comprises a blade portion 44 having a wide base and rounded, tapering sides extending to the free end or lip 45. Blade portion 44 is secured to the base portion 30 via web 46 so as to form slots or gaps 47, 48 on the outside and inside of the blade, respectively. Slots 47, 48 allow the blades to bend more easily on operation of the wiper. The cleaning tips 38 are joined directly to the base portion at their widest ends, with no slots, so that they are more rigid than the wiper blades and will not tend to bend at the base when pressure is applied at their ends.

The carrier strip 10 is designed to be mounted on a conventional wiper arm frame 12 having C-shaped clamps or clasps 50 which grip the upper flanges 18 of the carrier strip at spaced intervals. When the assembly is operated to wipe across a windshield 52 in the direction of the arrow in FIG. 8, the outer wiper blades will deform in a squeegee-like action against the surface of the windshield. The trailing slots or gaps 48 and 47, respectively, collapse to allow increased deformation of the blades, as illustrated in FIG. 8.

Figure 8:
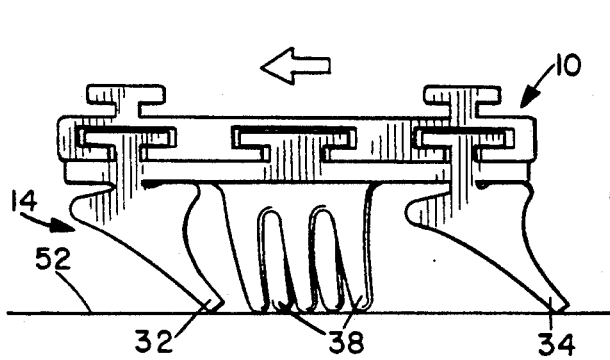
FIG. 8 is a view similar to FIG. 2, showing the wiping action.

As illustrated in FIG. 8, the relative dimensions of the outer wiper blades and the cleaning tips is such that the tips will not interfere with the wiping action of the leading blade when deformed to its maximum extent. In a preferred embodiment of the invention, the length of each wiper blade from the base portion to the tip was 0.5 inches while the cleaning tips were 0.475 inches in length. Each cleaning tip had a diameter of 0.125 inches at the base tapering to 0.0635 inches at the end of the tip. The spacing between the tips at the point of contact with the windshield was 0.125 inches.

Figure 4:
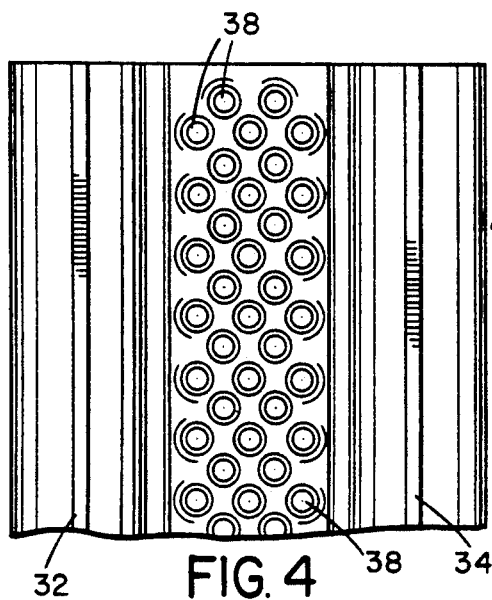
FIG. 4 is an underside view of the wiper blade.
Figure 5:
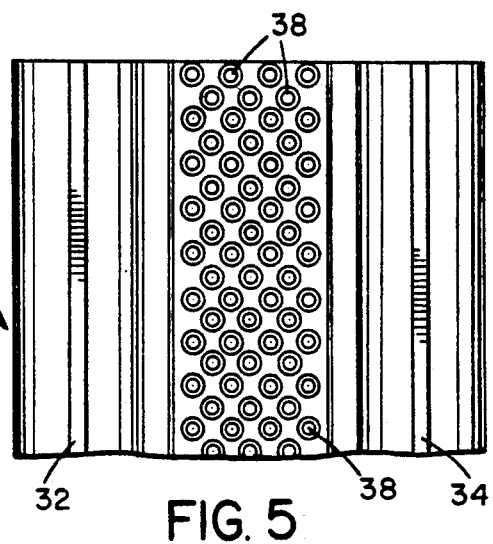
FIG. 5 is an underside view showing an alternative cleaning tip arrangement.

The cleaning tips are preferably arranged in offset rows of three and two tips, respectively, as illustrated in FIG. 4. FIG. 5 illustrates an alternative arrangement in which the alternating rows contain four and three tips, respectively. In each case, the adjacent rows are overlapped slightly so that the center to center spacing between the rows is less than the base diameter of the tips. This leaves substantially no gaps when the cleaning tips are viewed from the side or end, and provides an improved cleaning action covering substantially all areas of the windshield over which the blade travels. The cleaning tips may extend continuously along the entire length of the blade assembly. With the 3/2 arrangement illustrated in FIG. 4, and the above tip dimensions, a 15 inch wiper blade assembly would have approximately 360 cleaning tips.

The windshields of vehicles such as automobiles, trucks, buses and aircraft tend to accumulate debris such as grease film, sludge, insects, dust and the like. When the wiper assembly described above is wiped across a windshield surface, as illustrated in FIG. 8, the first or leading wiper blade 32 will tend to sweep away any moisture or loose debris. The ends of the cleaning tips will contact the glass and work in conjunction with any detergent applied to the glass to break up any film which has accumulated on the glass and to loosen any airborne particles or other objects which have become stuck to the glass. The trailing wiper blade 34 will then clear the loose residue from the windshield.

Figure 6:
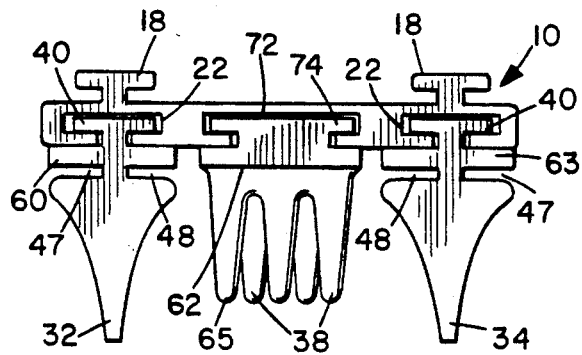
FIG. 6 is an end view similar to FIG. 2, showing separate outer blade and cleaning tip components.

In the embodiment illustrated in FIGS. 1-3 and 8, the wiper blade member is formed in one piece. However, the two outer wiper blades and the central cleaning tip portion may alternatively be formed as three separate parts with separate base portions 60, 62, 63, as illustrated in FIG. 6, and mounted in the same carrier strip 10. The central channel 72 in the carrier strip is made wider in this case, and the tongue 74 on base portion 62 of the cleaning tips is also made wider, for increased stability. Apart from being formed in separate parts, and the widening of the central channel 72 and tongue 74, the blades and cleaning tips are otherwise identical to the previous embodiment, and like reference numerals have been used as appropriate.

Figure 7:
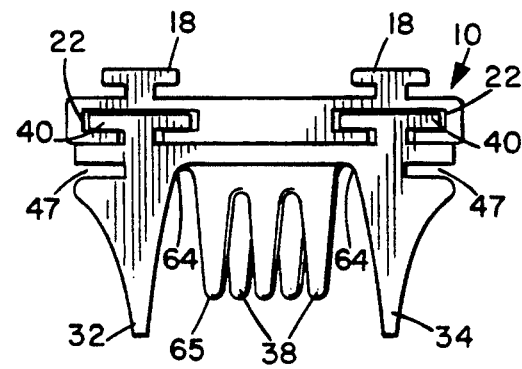
FIG. 7 is a further end view of a reduced width blade arrangement.

FIG. 7 illustrates another modified wiper blade member which is identical to that of FIGS. 1-3 apart from the elimination of the inner slots or gaps 48 on each blade 32, 34. Instead of forming slots 48, each blade 32, 34 is joined to the base portion 30 on the inside of the blade by a smooth, rounded extension portion 64 on the inner side surface of the blade. This allows the blades 32, 34 to be made closer together and closer to the central, cleaning tip portion, reducing vibration noise. Also in FIG. 7, the central channel 22 and mounting flange 40 are eliminated, with the blade member being supported by the two outer mounting flanges 40 engaging in the two outer channels 22.

Figure 9A:
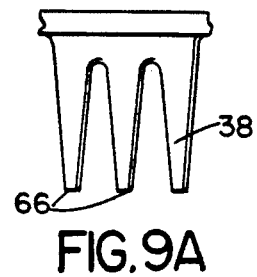
FIGS. 9A–9C illustrate alternative cleaning tip configurations.
Figure 9B:
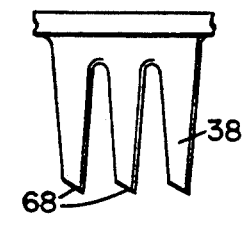
Figure 9C:
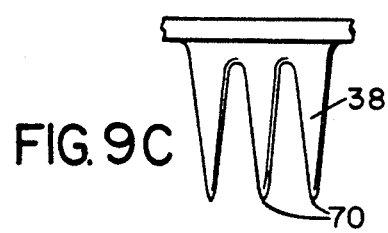

In the embodiments illustrated in FIGS. 1-7, the cleaning tips 38 have rounded ends 65. However, the ends of tips 38 may have alternative shapes, such as the flat ends 66 as illustrated in FIG. 9A, angled ends 68 as illustrated in FIG. 9B, and more pointed ends 70 as illustrated in FIG. 9C. The angled ends 68 will be angled in a direction parallel to the wiping direction for improved scraping action.

When a windshield is relatively clean, the wiper assembly may be used without detergent to keep the windshield clear. The elastomeric cleaning tips will act to prevent film build-up in such conditions. If the windshield is dirty, detergent may be applied during the wiping action and the cleaning tips will contact and scrub the screen clean in conjunction with the detergent. The blade member can be molded inexpensively in one piece or in three separate parts, as described above. Installation and replacement is quick and easy.

Although some preferred embodiments of the invention have been described above by way of example only, it will be understood by those skilled in the field that modifications may be made to the disclosed embodiments without departing from the scope of the invention, which is defined by the appended claims.

I claim:

1. A wiper blade assembly, comprising:
    an elongated carrier strip adapted for mounting on a windshield wiper arm;
    a wiper blade member having mounting means for releasably mounting the wiper blade member on the carrier strip;
    the wiper blade member comprising a flat, elongated base portion having a longitudinal axis along the length of the base portion and opposite longitudinal sides;
    a pair of spaced, elongated flexible wiper blades depending downwardly and parallel to one another from opposite sides of said base portion along the length of the base portion to leave a gap between the wiper blades, each wiper blade having a lower edge for contact with a windshield surface and a predetermined length between said base portion and lower edge in a direction transverse to the longitudinal axis of the base portion;
    a plurality of conical cleaning tips depending downwardly from a central region of said blade member in the gap between the wiper blades, the base portion, wiper blades and conical cleaning tips being formed integrally in one-piece from the same elastomeric material, the cleaning tips each having a length less than the length of said wiper blades; and
    the shape and dimensions of the wiper blades and cleaning tips being such that the cleaning tips are more rigid than the wiper blades.

2. The assembly as claimed in claim 1, wherein the cleaning tips are arranged in parallel rows extending transverse to the longitudinal axis of the base portion at spaced intervals along the length of the base, with the number of tips in alternating rows being n and n−1, respectively, where n is the maximum number of tips per row.

3. The assembly as claimed in claim 2, wherein the tips are transversely offset in adjacent rows and the rows are overlapped so that the spacing between adjacent rows is less than the maximum diameter at the base of a tip.

4. The assembly as claimed in claim 2, wherein the tips are arranged in alternating rows of three and two tips, respectively.

5. The assembly as claimed in claim 2, wherein the tips are arranged in alternating rows of four and three tips, respectively.

6. The assembly as claimed in claim 1, wherein the tips have rounded ends.

7. The assembly as claimed in claim 1, wherein the tips have flat ends.

8. The assembly as claimed in claim 1, wherein the tips have angled ends.

9. The assembly as claimed in claim 1, wherein each wiper blade has tapering opposite inner and outer side portions extending from the base portion to the lower edge of the respective blade, and at least the outer side portions have slots extending along the length of the blade between the outer side portion and the base portion.

10. The assembly as claimed in claim 1, wherein the base portion has opposite upper and lower faces, the wiper blades and cleaning tips depending from said lower face, and the upper face has a pair of spaced mounting flanges aligned with said wiper blades and projecting upwardly for engagement with said carrier strip, and the carrier strip has a pair of downwardly directed channels for slidably receiving the mounting flanges.

11. The assembly as claimed in claim 10, wherein the upper face of the base portion has an additional mounting flange aligned with said central region and projecting upwardly between said first-mentioned mounting flanges, and the carrier strip has an additional downwardly directed channel for slidably receiving the additional mounting flange.

12. The assembly as claimed in claim 11, wherein each channel is of predetermined width in a direction transverse to the longitudinal axis of the carrier strip, the additional channel has a width greater than that of said first-mentioned channels, and the additional flange has a transverse width substantially matching that of said additional channel.

13. A wiper blade member, comprising:
a flat, elongated base portion having a longitudinally axis, opposite side regions extending along the length of the base portion, an upper face and a lower face;
a pair of spaced, elongated, flexible wiper blades depending downwardly parallel to one another from opposite sides of said regions of said lower face of the base portion with a gap between the wiper blades, each wiper blade having a predetermined length in a downwards direction transverse to the longitudinal axis of said base portion;
a plurality of conical cleaning tips of elastomeric material depending downwardly from a central region of the lower face of the base portion between the wiper blades, each cleaning tip having a length less than that of the wiper blades;
the base portion having support means for supporting the blade member on a wiper arm; and
the base portion, tips and blades are formed integrally in one piece from the same material.

14. The member as claimed in claim 13, wherein the base portion, tips and blades are formed integrally.

15. Windshield wiper blade device, comprising:
an elongated carrier strip having mounting means for securing the carrier strip to a windshield wiper arm;
a pair of separate, elongated, flexible wiper blades each having a base portion, a lower edge for contacting a windshield surface, and tapering opposite side portions extending from the base portion to the lower edge, the base portion of each wiper blade having an upper mounting flange projecting upwardly and extending longitudinally along said base portion for releasable engagement with said carrier strip;
said carrier strip comprising support means for engaging said mounting flanges to maintain said blades parallel to one another with a gap between the blades; and
a cleaning member of elastomeric material supported in the gap between the wiper blades, the cleaning member comprising an elongated cleaning member base portion having a mounting flange projecting upwardly for releasable engagement with said carrier strip, and a plurality of conical cleaning tips depending downwardly from said cleaning member base portion, the tips extending parallel to the wiper blades, and each cleaning tip having a length less than that of the wiper blades.

16. The assembly as claimed in claim 15, wherein said carrier strip has a pair of outer, downwardly directed channels for slidable engagement with the mounting flanges of said wiper blade base portions, and a central, downwardly directed channel for slidable engagement with the mounting flange of said cleaning member base portion, each channel extending longitudinally along the strip and having a predetermined transverse width, each mounting flange having a transverse width substantially matching that of the corresponding channel of said carrier strip, the wiper blade mounting flanges being of equal width and the cleaning member mounting flange having a width greater than that of said wiper blade mounting flanges.

* * * * *